United States Patent
Reinders et al.

(10) Patent No.: US 6,228,315 B1
(45) Date of Patent: May 8, 2001

(54) TORSION CORDS AND METHOD FOR MOLDING THE SAME

(76) Inventors: Donald D. Reinders, 4125 Reed St., Fort Wayne, IN (US) 46806; Dale H. Scherer, 7319 Ridge Knoll Rd., Fort Wayne, IN (US) 46804

( * ) Notice: Subject to any disclaimer, the term of this patent is extended or adjusted under 35 U.S.C. 154(b) by 0 days.

(21) Appl. No.: 09/023,832

(22) Filed: Feb. 13, 1998

(51) Int. Cl.[7] .................................................. B29D 30/00
(52) U.S. Cl. .......................... 264/501; 264/552; 264/553; 264/563; 264/566; 264/567; 264/568; 264/573
(58) Field of Search ............................. 57/213, 230, 502; 428/172; 264/101, 501, 523, 532, 552, 553, 554, 563, 566, 567, 568, 569, 573

(56) References Cited

U.S. PATENT DOCUMENTS

| | | | |
|---|---|---|---|
| 4,385,486 | * | 5/1983 | Iwata et al. .......................... 57/58.52 |
| 4,628,683 | * | 12/1986 | Bourgous et al. ..................... 57/213 |

* cited by examiner

*Primary Examiner*—Merrick Dixon

(57) ABSTRACT

A new and improved apparatus and method for producing torsion cords comprising the steps of: (1) casting a torsion cord of a rubber composition, the mold having a high pressure resistant cylindrical wall and opposite closed ends, (2) efficiently curing the rubber composition at a moderate temperature and high pressure for an extended period of time in the mold, (3) reducing the pressure in the mold, and (4) removing the molded torsion cord from the mold. An improved torsion cord manufactured by the method of the invention is also provided having closely controlled dimensions and improved physical properties with fewer process control procedures.

17 Claims, 3 Drawing Sheets

TORSION CORDS AND METHOD FOR MOLDING THE SAME

BACKGROUND OF THE INVENTION

The present invention relates to the manufacturing of torsion cords and improved torsion cords that are used in the suspension of many vehicles, and more particularly to a new and improved method for manufacturing improved torsion cords at a lower manufacturing cost.

Torsion cords have been utilized in the axle suspension system of light duty trucks and recreation vehicles for several decades. Users must be assured that these torsion cords possess stringent physical properties, such as a closely held modulus range, and an extremely low compression set that are difficult to hold and produce competitively by means of conventional molding methods. A limited number of molders have provided torsion cords that have performed satisfactorily, but not without the need for improved production control and efficiency. It is therefore highly desirable to provide a new and improved method and apparatus for manufacturing torsion cords and improved torsion cords made in accordance therewith.

Torsion cords are made of natural or synthetic polyisoprene polymer that is blended with various ingredients to formulate a vulcanite. Polyisoprene is tough and generates heat rapidly during process mastication which can adversely affect the final properties of the torsion cords. Furthermore, the addition of processing oils, etc. that are commonly used to reduce heat and improved blending, is restricted. Thus, it is highly desirable to provide a new and improved method and apparatus for molding torsion cords. It is also highly desirable to provide a new and improved method and apparatus for molding torsion cords that will reduce the number of process functions. It also highly desirable to provide a new and improved method and apparatus for molding torsion cords that will reduce the process costs.

Torsion cords are vulcanized (cured), by the application of heat while the material is confined under pressure for a designed interval, all of which is correlated with a chemically formulated cure system. In the use of the prior molding apparatus and methods used for molding torsion cords, it is essential to economize by curing at the highest possible temperature to reduce the cure cycle time. Consequently, at these extreme limits, strict control of the rubber chemistry, the mixing, and the molding processes are imperative in order to obtain the modulus and compression set specifications. Therefore, it is highly desirable to provide a new and improved method and apparatus for molding torsion cords which will more efficiently provide an improved torsion cord. It is also highly desirable to provide a new and improved method and apparatus for molding torsion cords which allows for curing at moderate conditions. It is also highly desirable to provide a new and improved method and apparatus for molding torsion cords which will allow torsion cords to be manufactured within specified modulus and compression set tolerances more consistently.

Prior torsion cords are limited in length because of the molding equipment. These torsion cords are molded in 36 inch square two-part molds, each part having multiple cylindrical cavities 31.5 inches in length which comprise one-half the molded part. The plates are mounted in a 600 ton hydraulic press which vertically separates the plates while loading the raw material and unloading the molded product. Historically, because of these mechanical limitations, torsion cords have been provided in maximum lengths of only about 31 inches. Thus, torsion cords are available in the marketplace which are either 31 inches in length, or subsequently cut to fractions thereof to accommodate a variety of actual loads. In many instances, to meet a specified spring rate, the 31 inch torsion cord is cut to lengths which result in excessive waste. Therefore, it is highly desirable to provide a new and improved method and apparatus for making torsion cords in which torsion cords can be manufactured in a variety of lengths. It is also highly desirable to provide a new and improved method and apparatus for making torsion cords in which the torsion cords can be manufactured in any desired length to effect economy. It is also highly desirable to provide a new and improved method and apparatus for making torsion cords in which torsion can be manufactured at lengths longer than 31 inches.

The manufacturing of torsion cords in the past has had all of the limitations of any molding process utilizing molds which must be filled, closed and clamped during curing and when open, require the removal of parting line flash from the molded product. It is therefore, highly desirable to provide a new and improved method and apparatus for making torsion cords which have no parting line, no parting line flash, and none of the physical limitations of a conventional clamping system.

It is also highly desirable to provide a new and improved method and apparatus for making torsion cords which does not utilize conventional molding processes. It is also highly desirable to provide a new and improved method and apparatus for making torsion cords that can be easily developed into an automatic process.

Prior compression processes for molding torsion cords inherently presents difficulty in maintaining accurate closure dimensions that are caused by press equipment wear, mold damage, and raw material weight variances. Although, not preferred, diametral tolerances of ±0.013 must be expected. It is therefore highly desirable to provide a new and improved method and apparatus for making torsion cords in which diametral tolerances of ±0.005 inches can be easily held independent of auxiliary equipment and raw material preparation. It is also highly desirable to provide an improved method and apparatus for making torsion cords in which diametral tolerances of ±0.005 inches can be easily held without any parting line flash, and none of the physical limitations of conventional clamping systems.

Prior torsion cord molding processes need expensive tools and equipment. Molds costing up to $10,000 are needed for each product diametrical size. Large presses, a mixing mull, an extruder and cutting equipment in which another $500,000 to $600,000 investment is required, together with the cost of six workers per shift in direct labor. In addition to this, energy, maintenance, insurance, and floor space must enter into the manufacturing cost. It is therefore highly desirable to provide a new and improved apparatus and method for manufacturing torsion cords which requires less manpower, less tangible costs and lower capital investment.

Finally, it is highly desirable to provide a new and improved apparatus and method for making torsion cords and an improved torsion cord which possesses all of the above features.

SUMMARY OF THE INVENTION

It is therefore an object of the invention to provide a new and improved method and apparatus for manufacturing torsion cords and improved torsion cords made in accordance therewith.

It is also an object of the invention to provide a new and improved method and apparatus for molding torsion cords.

It is also an object of the invention to provide a new and improved method and apparatus for molding torsion cords that will reduce the number of process functions.

It is also an object of the invention to provide a new and improved method and apparatus for molding torsion cords that will reduce the process costs.

It is also an object of the invention to provide a new and improved method and apparatus for molding torsion cords which will more efficiently provide an improved torsion cord.

It is also an object of the invention to provide a new and improved method and apparatus for molding torsion cords which allows for curing at moderate conditions.

It is also an object of the invention to provide a new and improved method and apparatus for molding torsion cords which will allow torsion cords to be manufactured within specified modulus and compression set tolerances more consistently.

It is also an object of the invention to provide a new and improved method and apparatus for making torsion cords in which torsion cords can be manufactured in a variety of lengths.

It is also an object of the invention to provide a new and improved method and apparatus for making torsion cords in which the torsion cords can be manufactured in any desired length to effect economy.

It is also an object of the invention to provide a new and improved method and apparatus for making torsion cords in which torsion can be manufactured at lengths longer than 31 inches.

It is also an object of the invention to provide a new and improved method and apparatus for making torsion cords which have no parting line, no parting line flash, and none of the physical limitations of a conventional clamping system.

It is also an object of the invention to provide a new and improved method and apparatus for making torsion cords which does not utilize conventional molding processes.

It is also an object of the invention to provide a new and improved method and apparatus for making torsion cords that can be easily developed into an automatic process.

It is also an object of the invention to provide a new and improved method and apparatus for making torsion cords in which diametral tolerances of ±0.005 inches can be easily held independent of auxiliary equipment and raw material preparation.

It is also an object of the invention to provide a new and improved method and apparatus for making torsion cords in which a diametral tolerances of ±0.005 inches can be easily held without any parting line flash, and none of the physical limitations of conventional clamping systems.

It is also an object of the invention to provide a new and improved apparatus and method for manufacturing torsion cords which requires less manpower, less tangible costs and lower capital investment.

Finally, it is an object of the invention to provide a new and improved apparatus and method for making torsion cords and an improved torsion cord which possesses all of the above features.

In the broader aspects of this invention there is provided a new and improved apparatus and method for producing torsion cords comprising the steps of: (1) casting a torsion cord of a rubber composition, the mold having a high pressure resistant cylindrical wall and opposite closed ends, (2) efficiently curing the rubber composition at a moderate temperature and high pressure for an extended period of time in the mold, (3) reducing the pressure in the mold, and (4) removing the molded torsion cord from the mold. An improved torsion cord manufactured by the method of the invention is also provided having closely controlled dimensions and improved physical properties with fewer process control procedures.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
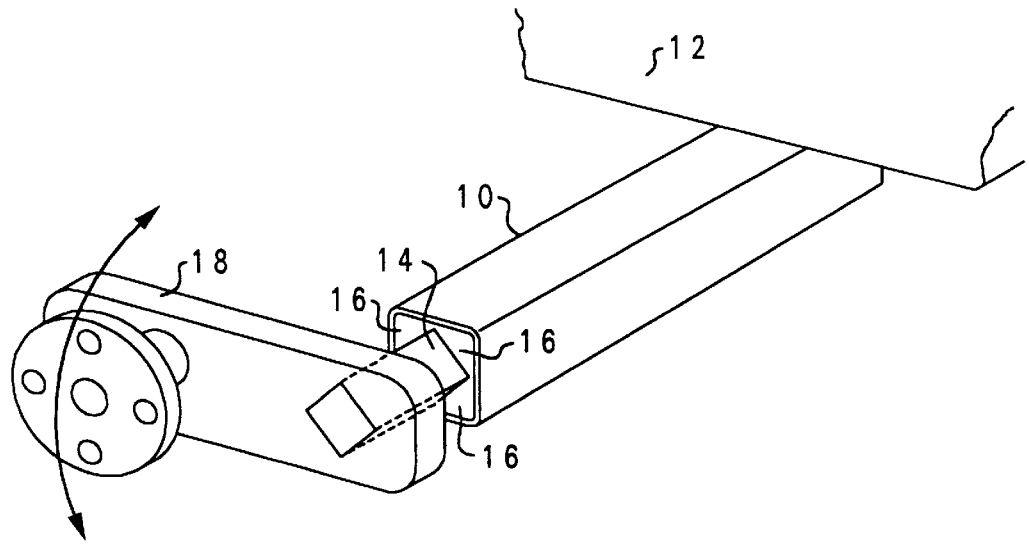
FIG. 1 is a fragmentary view of the vehicle frame with the hub assembly pulled from the frame showing the improved torsion cords of the invention in use.

The improved torsion cords of the invention in a truck chassis are shown in FIG. 1. The torsion cords 16 are positioned in a transverse frame member 10 which is secured to the longitudinal frame member 12 of the vehicle. The torsion cords 16 space a fixed frame axle 14 from the frame member 10 in a resiliently flexible manner. Four torsion cords 16 are shown. At the end of the axle is a wheel flange and lever 18 for mounting the wheel and tire for rotation relative to the axle 14.

Figure 2:
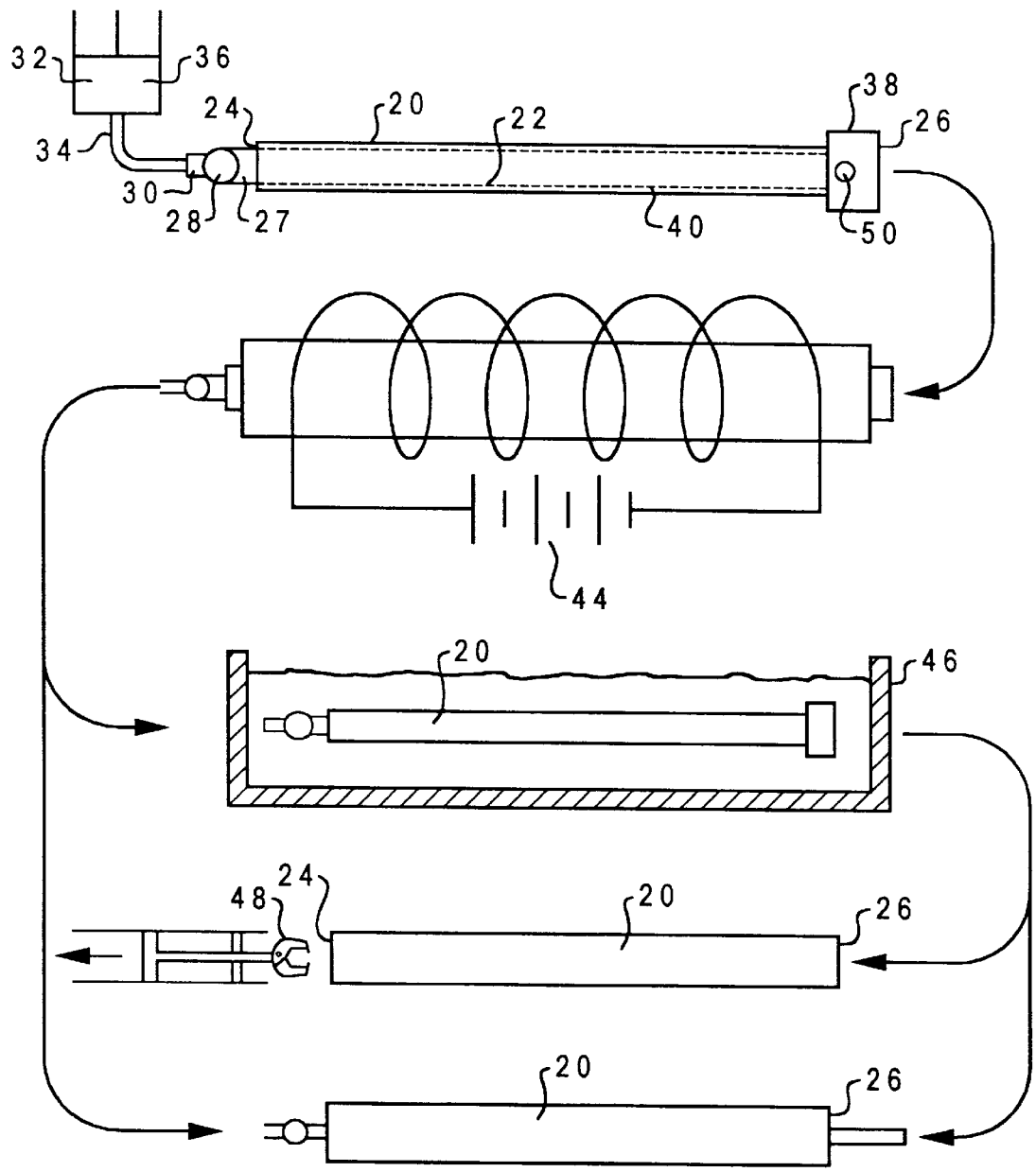
FIG. 2 is a diagrammatic illustration of the method of the invention showing the various steps of the invention including alternate removing steps.

Referring to FIG. 2, the method of the invention in which the wheel cords 16 can be cast in any length desired is shown. The mold 20 in which the cords 16 are cast is a tubular member having a length equal to the desired length of cords 16 and a wall thickness sufficient to withstand the pressure of the cure. Molds 20 has an interior passageway 22 defined by a smooth wall of constant dimension extending between the opposite ends 24 and 26 of mold 20. Passageway 22 has a shape corresponding to the shape of the cord 16 desired. The surface of the passageway 22 wall is the surface desired on the cord. End 24 is threaded to receive a fitting 7 into which check valve 28 is positioned. The opposite side of check valve 28 is threaded to receive a coupling 30 from an extruder 32 which is used to feed end 24 with the uncured rubber composition from which cords 16 are made. Extruder 32 is connected to coupling 30 by a line 34. The inner chamber 36 of extruder 32, check valve 28, coupling 30 and fitting 27 all must withstand the pressure in the mold 20. At end 26, a cap 38 is used to close that end, and to complete the mold chamber 40 fully defined by passageway 22, cap 38 and fitting 27.

The mold 20 must be heated to about 300° to 330° F. during cure and thus must be inserted into an oven 42 during the cure stage. Oven 42 is shown diagrammatically as an electrical coil powered by a power source 44. Several different types of commercially available ovens will suffice. After the cure has been completed the cord must be removed from the mold. FIG. 2 illustrates three alternate methods of removal. In the first, the mold 20 is removed from oven 42 and cooled to room temperature in a bath 46. Bath 46 may be chosen from water baths and oil baths or the mold 20 may be air cooled. Once cooled, mold 20 has end cap 38 removed and fitting 27 opened at opposite end 24, and the completed cord is grasped by hand or by a puller 48 and pulled out of mold 20.

In another removal sequence, the mold 20 after the cure stage is either cooled or partially cooled, and the puller 48 is used to remove the completed cord 16 from the mold 20 or the mold 20 is not cooled to room temperature and the end cap 38 and/or the fitting 27 is removed from the hot or partially cooled mold 20. In this manner, the completely cured cord 16 is allowed to expand from at least one of the mold ends 24, 26 as shown in FIG. 2 as it is air cooled. Once cooled by any method it has been surprisingly found that the cord 16 may be grasped and pulled from the mold 20 relatively easily.

As with the other casting processes, it has been found useful in the casting process of the cord 16 to place a small vent 50 in the mold 20. Preferably vent 50 is placed in end cap 38 such that air or air bubbles may be removed from filled mold 20. Vent 50 may also be used to control the pressure within mold 20.

Figure 3:
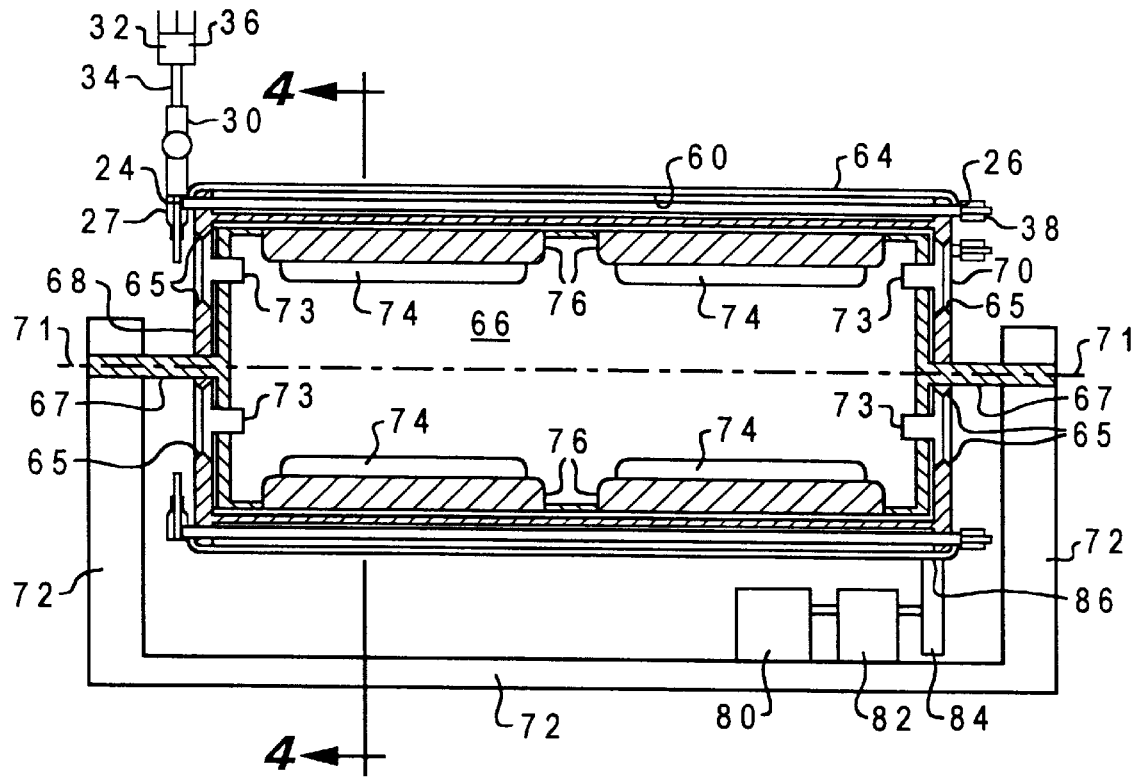
FIGS. 3 and 4 are cross-sectional views illustrating diagrammatically the method of the invention illustrated in FIG. 2 in a rotary continuous mode.
Figure 4:
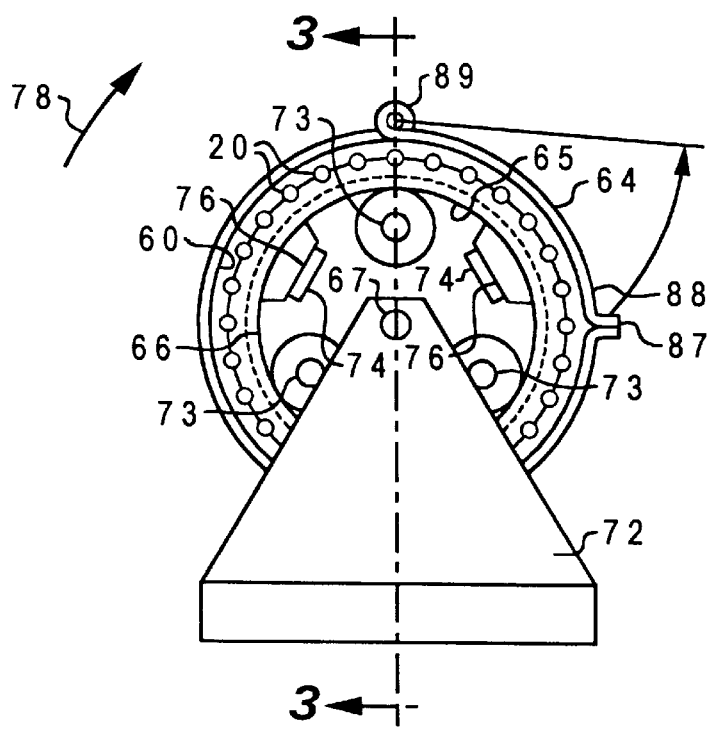

Referring to FIGS. 3 and 4, a first version of a continuous molding process for torsion cords is illustrated. In this version, extruder 32 is utilized in the same fashion as above described to fill each of the molds 20 via the conduit 34, the fitting 27, coupling 30, and the check valve 28. The molds 20, however, are positioned in cylindrical passageways 60 which extend through a drum 64 which is mounted for rotation on a stationary cylindrical oven 66 having rod segments 67 extending from its opposite ends 68, 70 along its longitudinal axis 71. Both oven 66 and rod segments 67 are cylindrical in shape and are coaxial. Rod segments 67 are secured to ground support 72. Oven 66 has a plurality of wheels 73 journaled for rotation at ends 68, 70 which support drum 64 thereon. Drum 64 has cylindrical races 65 which wheels 73 engage. Drum 64 and oven 66 are coaxial. Oven 66 is heated by a plurality of radiant heaters 74 positioned within oven 66 behind windows 76 for heating the drum 64 to cure temperatures. Drum 64 is made of a heat conductive material such that the heat produced by heaters 74 is transferred to the drum 64 and ultimately to the molds 20 positioned within the passageways 60 of the drum 64. The drum 64 is rotated in the direction of the arrow 78 by a motor 80 secured to ground support 72 driving drum 64 through transmission 82 and planet gear 84. Planet gear 84 is engaged to a cylindrical gear 86 which is secured to the drum 64.

Each of the passageways 60 are filled with molds 20. Molds 20 may be positioned in passageways 60 and removed from the passageways 60 by opening the door 88 hinged at 89 to drum 64. Door 88 is otherwise kept closed by latch 87.

In a specific embodiment, oven 66 may be insulated, and drum 64 may be manufactured from steel. Drum 64 may have 27 molds 20 positioned in 27 passageways 60 thereof and the drum 64 may be rotated at a rate of one revolution for each 15 minutes of operation. Such would provide a 15-minute cure cycle with each mold 20 having a loading and unloading interval of 37 seconds. Such a rotation would allow for an output of 97.3 torsion cords per hour. Five foot cords would generate 5,838 inches per man hour of the improved torsion cord of the invention.

Figure 5:
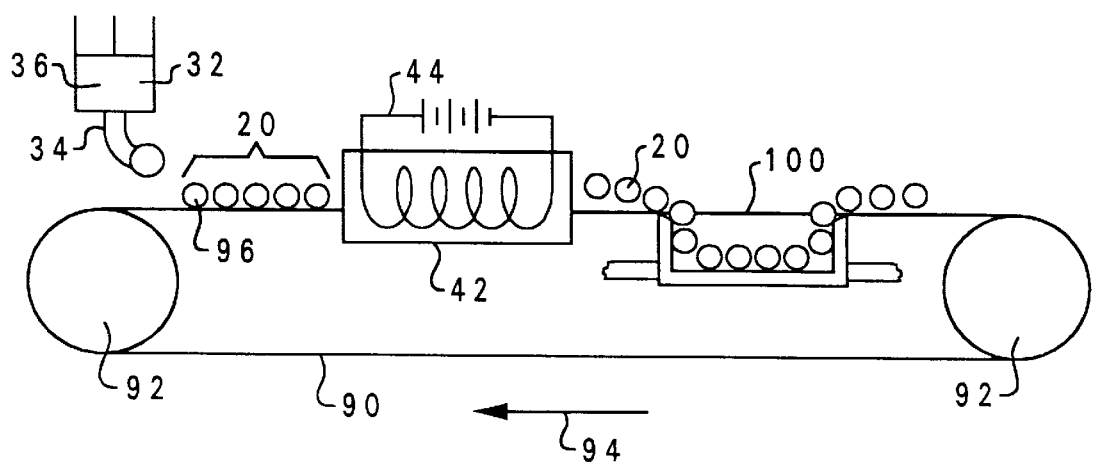
FIG. 5 illustrates diagrammatically the method of the invention illustrated in FIG. 2 in a linear continuous mode.

Referring to FIG. 5, there is shown an alternate continuous version of the method of the invention. This version is linearly continuous in contrast to the rotary continuous version of FIGS. 3. In this version, the molds 20 are laid transversely on a continuous conveyor belt 90. Belt 90 is trained around opposite end drums 92 and rotated in the direction of arrow 94 so as to be continuous. At position 96, molds 20 are filled again by extruder 32, through conduit 34, coupling 30, check valve 28 and fitting 27 as above described. Molds 20 once filled and capped are moved along the conveyor through oven 42 which is shown to be a cylindrical oven having opposite ends. Molds 20 then are moved via the conveyor through a cooling bath 100 of the type above described. Molds 20 exit bath 100 for cord removal by either the methods utilizing extractor 48 or by uncapping molds 20 while still hot from the cure stage.

In a specific embodiment, extruder 32 may be a modified conventional injection unit as manufactured by Industrial Injection Machine Mfg. Mold 20 may be lengths of conventional mechanical DOM tubing of the size required. Oven 42 may be a commercial oven as manufactured by Industrial Oven Mfg. Conveyor 90 may be a modified conveyor as manufactured by Industrial Conveyor Builders.

In specific embodiments, the rubber composition being fed and in which the molds 20 are filled comprises a mixture of natural or synthetic isoprene polymer, carbon black and vulcanizing chemicals. This formulation is cured at temperatures ranging from 300° to 325° F., at pressures ranging from 4,000 psig to 8,000 psig to (1) a specified bulk modulus range of ±200 units, and (2) a maximum 8% compression set average. This results in an improved torsion cord when compared to the torsion cords presently being manufactured. The major difference between the torsion cords produced by the method of the invention and those conventionally made, other than the improved dimensional tolerances above mentioned, is that the modulus is reached using the method of the invention by cures at elevated pressures, moderate temperatures, extended cure periods which provides a stable modulus control through the carbon content of the formulation, whereas the torsion cord as conventionally manufactured obtains its modulus control primarily by the cross linking of vulcanizing chemicals.

In operation, the rubber composition of the invention is placed within the cavity 36 of the extruder 32 and pressure is applied to feed the rubber composition through the conduit 34, the fittings 27, coupling 30 and the check valve 28 into the mold cavity 40 of the mold 20. The molds 20 can be preheated before filling to a temperature ranging from about 170° F. to about 200° F. The mold 20 is capped at end 26 with cap 38 and thus fills up under the pressure exerted by the extruder 32. Once filled as shown by the rubber composition exiting vent 50, the extruder pressure is held by the check valve 28. The coupling 30 is disconnected from the mold check valve 28 and the mold 20 is moved into the oven for curing. The check valve 28 prevents the rubber composition from exiting through fitting 27 and the cap 38 prevents the other end of the mold from releasing any rubber composition from the mold cavity 40. The entire mold 20 with the rubber composition therein is then cured at temperatures ranging from 300° to 325° F. in oven 42. Any air bubbles within the composition within the mold 20 are released through vent 50 and excess pressure within the mold 20 is also released through vent 50. The pressure within mold 20 has been measured from about 4,000 to about 8,000 psig depending upon the temperature and the composition.

Once the rubber composition in the mold 20 is cured, the removal of the finished torsion cord 16 from the mold 20 is accomplished by one or more means. The first removal means comprises simply removing end cap 38 from the mold 20 while still at cure temperatures or somewhat below and allowing the release of pressure within the mold cavity 40. This usually results in the expansion of torsion cord 16 from end 26 by 3 or 4 inches. The torsion cord 16 can then be manually grasped and pulled from the mold 20.

An alternative method of removal of the cord 16 from the mold 20 is to partially cool the same in bath 46 prior to removing cap 38 in order to prevent hot tearing of the smaller cords 16 from mold 20. This has been accomplished in 1½ hours for less than full cooling and for each manufacturing cycle by cooling the mold 20 to temperatures from about 325° F. to about 160° F. At this temperature, the cavity extension provided in cap 38 is grasped to pull the torsion cord 16 from the mold 20 when partially cooled.

A third method of removal of the cured torsion cord 16 from mold 20 is to totally cool the mold 20 in bath 46 to room temperature. At room temperature, the end cap 38 is removed from the mold 20 which allows the removal of the torsion cord from the open mold cavity 40 using the extractor 48.

Referring to FIGS. 3 and 4, the process above described is performed in a continuous manner. Each of the molds 20 are positioned within a cavity 60 of the drum 64. The drum 64 is journaled for rotation on stand 72. Drum 64 is rotated via the motor transmission gear combination 80 through 86. When the mold 20 returns to the filled position shown in FIG. 3, the drum stops. In the fill position, the mold 20 is connected to the extruder 34. The end cap 38 is removed. After extracting the torsion cord 16, the mold is filled.

Referring to FIG. 5, molds 20 are filled as above described and placed on the conveyor transversely of conveyor belt 90 as shown. Molds 20 are conveyed through oven 42 and cooled in bath 100, emptied and refilled as above described.

As with the rotary continuous version of FIGS. 3 and 4, the linearly continuous version of FIG. 5 has a 37 second interval for filling, a 15-minute cure cycle and an output of 97.3 pieces per hour or 5,838 inches of torsion cord per man-hour in specific embodiments.

The improved method and torsion cord of the invention can be used for the manufacture of improved torsion cords at any length desired, the improved torsion cords having improved physical properties resulting from the cure at moderate temperature and high pressure. Torsion cords can be manufactured without flashing or other imperfections causing post mold manual operations to arrive at desired tolerances for significantly less cost than that experienced with conventional manufacturing methods.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A method of producing torsion cords, comprising the steps of:

providing a pressure resistant one-piece tubular member having an interior wall defining an interior passageway, and opposite first and second open ends;

sealingly connecting a fitting to the first open end while maintaining fluid communication with the passageway;

closing the second open end with a cap;

inserting a check valve to open and close fluid communication between an extruder and the passageway;

allowing fluid communication through the open check valve between the passageway and the extruder;

filling under pressure the interior passageway from the first end with an uncured rubber composition from the extruder;

closing the check valve after filling the cylindrical passageway and fitting;

disconnecting the fitting from the extruder;

curing the rubber composition;

opening one end of the tubular member after curing;

removing the torsion cord from the interior passageway; and wherein the removed torsion cord has no parting line on an outer wall for a length corresponding to the interior passageway.

2. A method of claim 1, further comprising the steps of:

allowing the cured torsion cord to expand out of the open end of the tubular member; and pulling an expanded portion of the torsion cord to remove the torsion cord from the interior passageway.

3. A method of claim 2, further comprising the step of:

cooling the tubular member before opening the end after curing.

4. A method of claim 2, wherein the first end is threaded and the fitting connects to the first end by screwing.

5. A method of claim 2, wherein the rubber composition is cured at a temperature ranging from about 300° F. to 330° F.

6. A method of claim 2, wherein the rubber composition is cured in the one-piece tubular member in an oven.

7. A method of claim 2, wherein the interior passageway, fitting, and cap define a cylindrical mold chamber with a diameter ranging from 0.25 in. to 1.25 in. ±0.003 inches.

8. A method of claim 7, wherein the mold chamber has a length ranging from about 50 in. to about 60 inches.

9. A method of claim 2, further comprising the step of:

preheating the tubular member before filling the interior passageway.

10. A method of producing torsion cords, comprising the steps of:

providing a pressure resistant one-piece tubular member having an interior wall defining a smooth, cylindrical interior passageway, a first threaded open end and an opposite second open end;

screwing a fitting to the first open end while maintaining fluid communication with the passageway;

closing the second open end with a cap having a vent;

inserting a check valve in the fitting to open and close fluid communication between an extruder and the passageway;

allowing fluid communication through the open check valve between the passageway, the extruder and the vent;

filling the interior passageway from the first end with an uncured rubber composition from the extruder;

allowing uncured rubber composition to exit the vent in the cap;

closing the check valve after uncured rubber composition exits the vent;

disconnecting the fitting from the extruder;

curing the rubber composition to form the torsion cord;

releasing pressure from the tubular member after curing by first removing the cap from the second end of the tubular member;

removing the torsion cord from the passageway; and wherein the removed torsion cord has a smooth outer wall for a length corresponding to the interior passageway and no parting line along the length.

11. A method of claim 10, further comprising the steps of:

cooling the tubular member before releasing pressure;

allowing the cured torsion cord to expand out of the open second end of the cooled tubular member; and pulling an expanded portion of the cured torsion cord to remove the torsion cord from the interior passageway.

12. A method of claim 10, wherein the rubber composition is cured at a temperature ranging from about 300° F. to 330° F.

13. A method of claim 10, wherein the rubber composition is cured in the one-piece tubular member in an oven.

14. A method of claim 10, wherein the interior passageway, fitting, and cap define a cylindrical mold chamber with a diameter ranging from 0.25 in. to 1.25 in. ±0.005 inches.

15. A method of claim 14, wherein the mold chamber has a length ranging from about 50 in. to about 60 inches.

16. A method of claim 10, further comprising the step of:

preheating the tubular member before filling the interior passageway.

17. An improved torsion cord molded in accordance with the method of claim 1.

* * * * *